Figure 1:
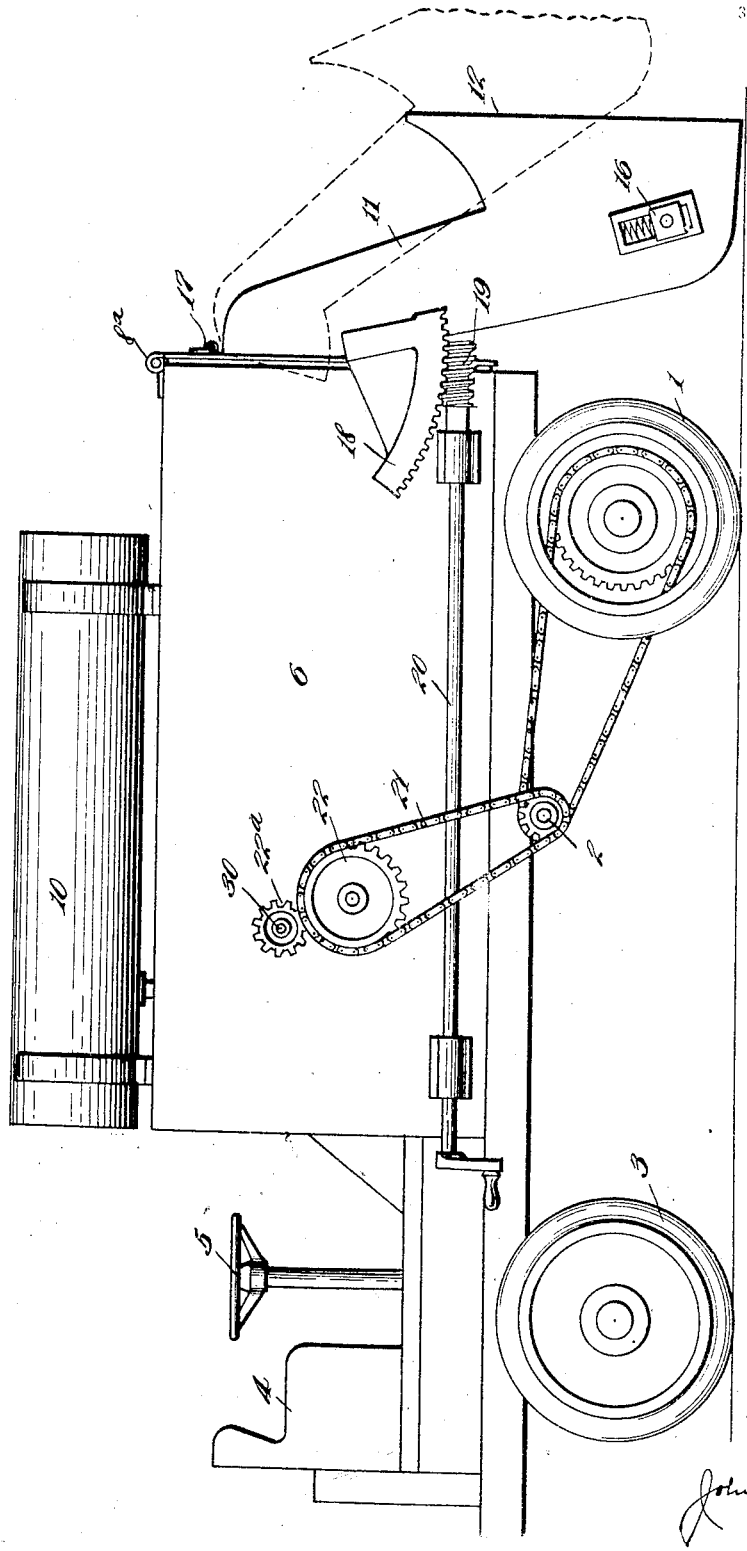

E. O. LOEBER.
SNOW REMOVING MACHINE.
APPLICATION FILED MAY 13, 1920.

1,409,744.

Patented Mar. 14, 1922.
3 SHEETS—SHEET 1.

INVENTOR
E. O. Loeber
BY
John A. Bonnhardt
ATTORNEY

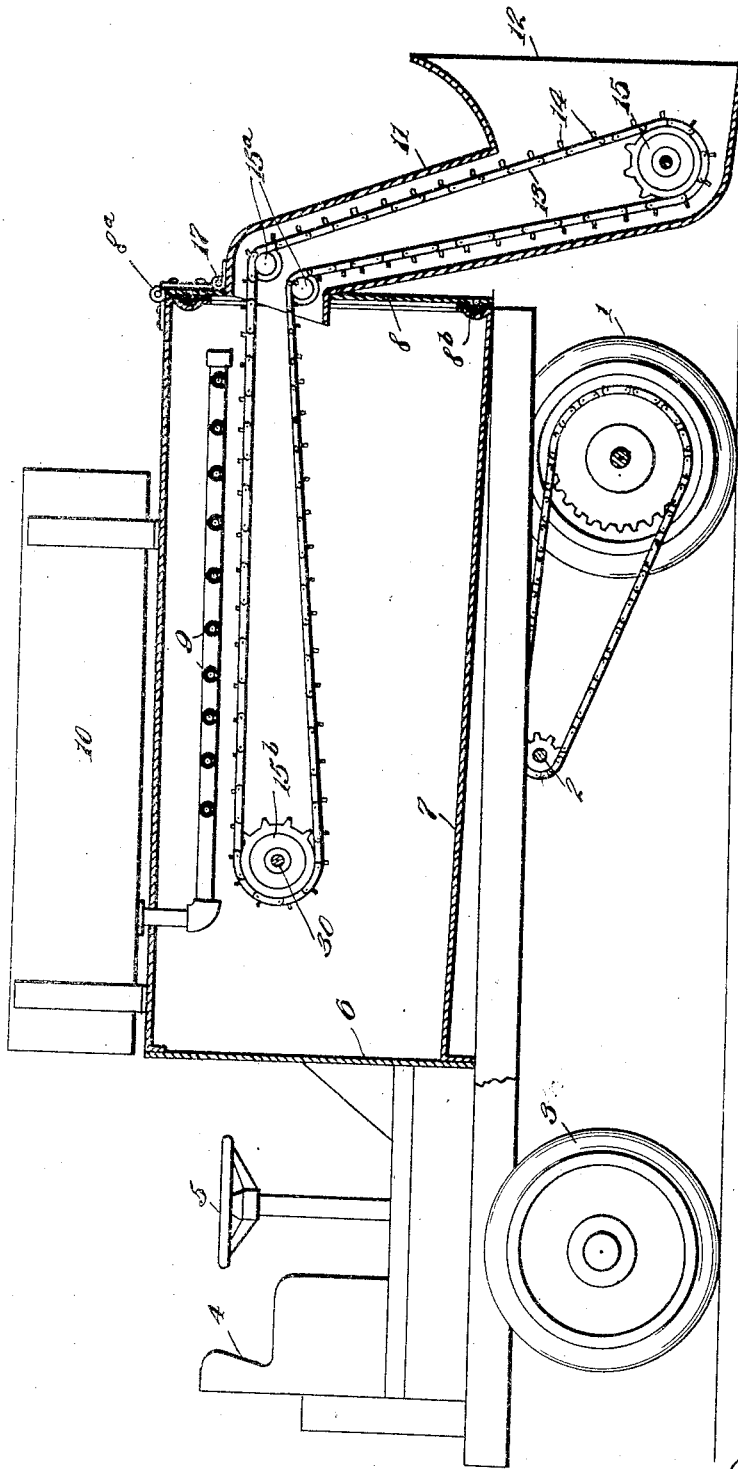

E. O. LOEBER.
SNOW REMOVING MACHINE.
APPLICATION FILED MAY 13, 1920.
1,409,744.
Patented Mar. 14, 1922.
3 SHEETS—SHEET 3.
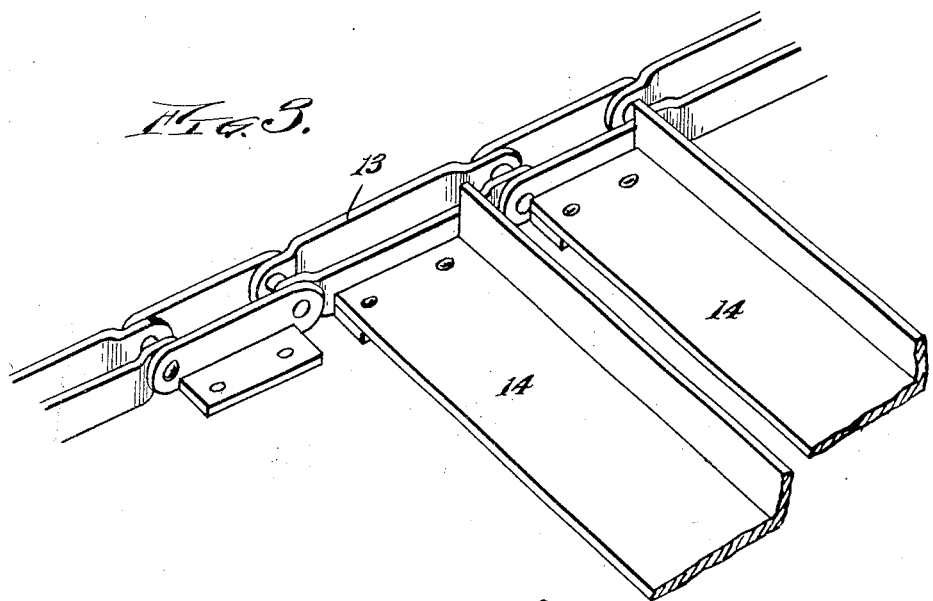
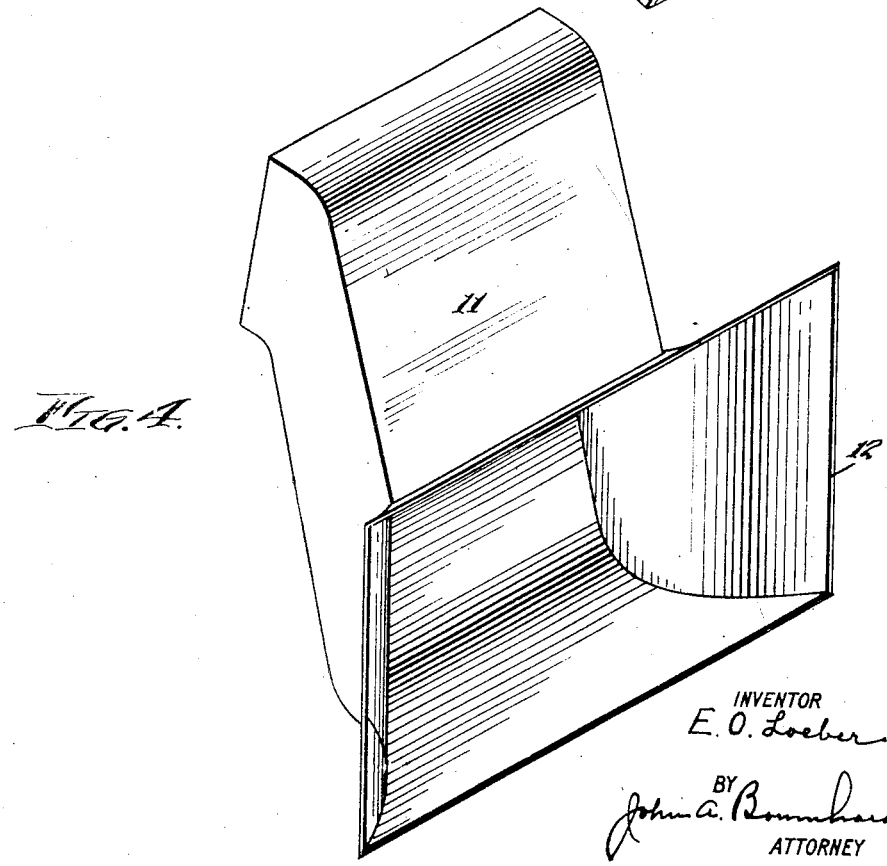
INVENTOR
E. O. Loeber
BY John A. Bommhardt
ATTORNEY

UNITED STATES PATENT OFFICE.

EDGAR O. LOEBER, OF LAKEWOOD, OHIO.

SNOW-REMOVING MACHINE.

1,409,744. Specification of Letters Patent. Patented Mar. 14, 1922.

Application filed May 13, 1920. Serial No. 381,112.

*To all whom it may concern:*

Be it known that I, EDGAR O. LOEBER, a citizen of the United States, residing at Lakewood, in the county of Cuyahoga and State of Ohio, have invented certain new and useful Improvements in Snow-Removing Machines, of which the following is a specification.

This invention relates to machines for removing and melting snow. Snow removal is a matter of considerable importance and is something of a problem especially in connection with clearing city streets in the north. The purpose and object of the present invention is to provide a machine by means of which the snow will be collected and then exposed to direct action of flame by which it is melted and the water drops to a tank from which it may be discharged into a sewer or elsewhere when necessary.

The machine is adapted to be power driven and can conveniently include an ordinary automobile chassis with certain modifications to be referred to hereinafter.

The invention is illustrated in the accompanying drawings in which Figure 1 is a side elevation of the machine. Fig. 2 is a longitudinal section. Fig. 3 is a detail of the chain elevator and conveyor; and Fig. 4 is a perspective detail of the scoop as viewed from the forward end.

Referring specifically to the drawings, an automobile truck is shown provided with front wheels 1 which are driven from the jack shaft 2, the steering being effected by the rear wheels 3, a seat for the operator is indicated at 4, and the steering wheel at 5, the driving and steering being done at the rear end instead of the front end as with an ordinary truck. The tank 6 is mounted on the frame, and is provided with an inclined bottom 7 and a hinged end 8 which may be opened to let off the water, the hinge being indicated at $8^a$, and any suitable packing being employed to make a tight joint when closed, one form thereof being indicated at $8^b$.

Mounted in the upper part of the tank are a plurality of burners 9 which are supplied with oil under pressure from a supply tank 10 mounted on the top of the water tank 6. The jets from these burners are directed downwardly. Mounted upon the end 8 is a tubular or hollow housing 11, the lower end of which is enlarged and flared to form a scoop 12. This scoop and housing extend across the front end of the machine and are supported by means of the hinge at 17 and may be adjusted by a segment rack 18 fixed to the housing and in mesh with a worm 19 at the end of a shaft 20 carried at the side of the tank 6. This shaft may be turned by hand to swing the scoop and housing up or down and thereby adjust its position with respect to the ground on which the machine travels.

Within the scoop and housing is the front lower end of a chain conveyor 13 which carries flights or angular buckets 14 by which the snow picked up by the scoop 12 is carried into the tank. The conveyor chains pass over sprockets 15 near the bottom of the scoop and thence over guide wheels $15^a$ at the top of the housing and at the rear over wheels $15^b$ near the rear end of the tank. The upper run of the conveyor travels rearwardly and is positioned slightly below the burners 9. The shaft of the sprockets 15 is preferably mounted in yielding boxes 16 set in the side walls of the housing, so as to take up slack in the conveyor chains. The conveyor is driven by a belt 21 from the jack shaft 2 and gears 22 and $22^a$ the latter being mounted on the shaft 30 of sprocket wheels $15^b$. Suitable gears may be employed to drive the conveyor at any speed desired, and clutch may be provided on the jack shaft to control the conveyor drive.

In operation the machine is advanced against snow on the ground and the conveyor acts to pick up the snow entering the scoop 12 and carries the same along under the burners 9 the flame from which melts the snow and the water falls into the tank 6 from which it may be discharged at intervals. The direct contact of the flame with the snow on the conveyor gives a very effective action and one much superior to heaters lacking this feature. The adjustment of the housing 11 enables the machine to be used on either rough or smooth roadways, or to run close to or further from the ground, and so the machine will be found useful under all conditions.

While I have shown this specific form of structure it is obvious that numerous modifications may be obtained by those familiar with the art and I do not wish to be limited further than is required by the state of the art and that which comes within the scope of the appended claims.

I claim:

1. In a snow removing machine, the combination of a portable tank, a burner extending along the upper part thereof, a housing depending from the tank and opening into the same and having a scoop at its lower end, a conveyor running in the housing and in the tank and in heating relation to the burner, and means to drive the conveyor.

2. In a snow removing machine, the combination of a portable tank, a burner in the upper part thereof, a scoop adjustably mounted on the front end of the tank, and an endless belt conveyor between the scoop and the tank, the upper run of the conveyor passing along within the tank and directly under the burner, and adapted to convey snow from said scoop to the heating zone of the burner, and means to drive the conveyor.

3. In a snow removing machine, the combination with a portable water tank, of a burner extending along the upper part of the tank, a hollow housing communicating with the tank and having a scoop at its lower end adjacent the ground, an endless belt conveyor extending from the rear part of the scoop through the housing and into the tank and running directly under the burner, and means to drive the conveyor.

4. In a snow removing machine, the combination with a portable tank, of a burner therein, a scoop the mouth of which is located adjacent the ground and the rear end of which opens into said tank, a conveyor having an elevating section running from said scoop into the tank and a longitudinal section traversing said tank directly under the burner, and means to drive the conveyor.

In testimony whereof, I do affix my signature in presence of two witnesses.

EDGAR O. LOEBER.

Witnesses:
C. W. ROSENBERG,
JOHN A. BOMMHARDT.